US008543898B2

(12) United States Patent
Idicula et al.

(10) Patent No.: US 8,543,898 B2
(45) Date of Patent: Sep. 24, 2013

(54) TECHNIQUES FOR MORE EFFICIENT GENERATION OF XML EVENTS FROM XML DATA SOURCES

(75) Inventors: Sam Idicula, San Jose, CA (US); Ning Zhang, Belmont, CA (US); Sivasankaran Chandrasekar, Palo Alto, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1442 days.

(21) Appl. No.: 11/938,020

(22) Filed: Nov. 9, 2007

(65) Prior Publication Data

US 2009/0125693 A1 May 14, 2009

(51) Int. Cl.
*G06F 17/00* (2006.01)

(52) U.S. Cl.
USPC .......................................... 715/200; 715/234

(58) Field of Classification Search
USPC .......................... 715/234, 243, 254, 255, 200
See application file for complete search history.

(56) References Cited

U.S. PATENT DOCUMENTS

| 5,295,261 A | 3/1994 | Simonetti |
| 5,404,513 A | 4/1995 | Powers et al. |
| 5,467,471 A | 11/1995 | Bader |
| 5,680,614 A | 10/1997 | Bakuya et al. |
| 5,724,577 A | 3/1998 | Exley et al. |
| 5,734,887 A | 3/1998 | Kingberg et al. |
| 5,878,415 A | 3/1999 | Olds |
| 5,974,407 A | 10/1999 | Sacks |
| 5,987,506 A | 11/1999 | Carter et al. |
| 6,003,040 A | 12/1999 | Mital et al. |
| 6,018,747 A | 1/2000 | Burns et al. |
| 6,038,563 A | 3/2000 | Bapat et al. |
| 6,055,544 A | 4/2000 | DeRose et al. |
| 6,061,684 A | 5/2000 | Glasser et al. |
| 6,128,610 A | 10/2000 | Srinivasan et al. |

(Continued)

FOREIGN PATENT DOCUMENTS

| EP | 1 241589 A2 | 9/2002 |
| WO | WO 00/49533 A2 | 8/2000 |

(Continued)

OTHER PUBLICATIONS

Peer to Patent, Third Party submission for PGPUB 20090125495, "Optimized streaming evaluation of xml queries", Sep. 1, 2009.

(Continued)

*Primary Examiner* — Kyle Stork
(74) *Attorney, Agent, or Firm* — Hickman Palermo Truong Becker Bingham Wong LLP

(57) ABSTRACT

One may increase the efficiency of an XML event-generating process by reducing the number of requests to allocate or deallocate system memory. Such reduction may occur as the result of pre-allocating a memory chunk of sufficient size to contain all of the memory buffers required by a particular event-generating process. Instead of allocating new memory chunks for new memory buffers, an application may store any required buffers within the pre-allocated memory chunk. A sufficient memory size may be estimated by performing the event-generating process on a training set of XML documents. Also, an application may re-use buffers during the process or between different iterations of the process, thus avoiding the need to deallocate and reallocate memory that is essentially being used for the same purpose.

34 Claims, 6 Drawing Sheets

(56) References Cited

U.S. PATENT DOCUMENTS

| | | | |
|---|---|---|---|
| 6,141,655 A | 10/2000 | Johnson et al. |
| 6,154,741 A | 11/2000 | Feldman |
| 6,189,012 B1 | 2/2001 | Mital et al. |
| 6,199,195 B1 | 3/2001 | Goodwin et al. |
| 6,208,993 B1 | 3/2001 | Shadmone |
| 6,236,988 B1 | 5/2001 | Aldred |
| 6,263,332 B1 | 7/2001 | Nasr et al. |
| 6,269,380 B1 | 7/2001 | Terry et al. |
| 6,279,006 B1 | 8/2001 | Shigemi et al. |
| 6,279,007 B1 | 8/2001 | Uppala |
| 6,298,349 B1 | 10/2001 | Toyoshima et al. |
| 6,343,287 B1 | 1/2002 | Kumar et al. |
| 6,356,920 B1 | 3/2002 | Vandersluis |
| 6,366,934 B1 | 4/2002 | Cheng et al. |
| 6,370,537 B1 | 4/2002 | Gilbert et al. |
| 6,470,344 B1 | 10/2002 | Kothuri et al. |
| 6,487,546 B1 | 11/2002 | Witkowski |
| 6,496,842 B1 | 12/2002 | Lyness |
| 6,523,062 B1 | 2/2003 | Bridgman et al. |
| 6,539,398 B1 | 3/2003 | Hannan et al. |
| 6,571,231 B2 | 5/2003 | Sedlar |
| 6,598,055 B1 | 7/2003 | Keesey et al. |
| 6,604,100 B1 | 8/2003 | Fernandez et al. |
| 6,609,121 B1 | 8/2003 | Ambrosini et al. |
| 6,635,088 B1 | 10/2003 | Hind et al. |
| 6,636,845 B2 | 10/2003 | Chau et al. |
| 6,643,633 B2 | 11/2003 | Chau et al. |
| 6,662,342 B1 | 12/2003 | Marcy |
| 6,684,227 B2 | 1/2004 | Duxbury |
| 6,704,739 B2 | 3/2004 | Craft et al. |
| 6,704,747 B1 | 3/2004 | Fong |
| 6,708,186 B1 | 3/2004 | Claborn et al. |
| 6,718,322 B1 | 4/2004 | Brye |
| 6,725,212 B2 | 4/2004 | Couch et al. |
| 6,754,661 B1 | 6/2004 | Hallin et al. |
| 6,772,350 B1 | 8/2004 | Belani et al. |
| 6,785,673 B1 | 8/2004 | Fernandez et al. |
| 6,801,224 B1 | 10/2004 | Lewallen |
| 6,826,727 B1 | 11/2004 | Mohr et al. |
| 6,836,778 B2 | 12/2004 | Manikutty et al. |
| 6,836,857 B2 | 12/2004 | Ten-Hove et al. |
| 6,883,137 B1 | 4/2005 | Girardot et al. |
| 6,920,457 B2 | 7/2005 | Pressmar |
| 6,964,025 B2 | 11/2005 | Angiulo et al. |
| 7,013,425 B2 | 3/2006 | Kataoka |
| 7,031,956 B1 | 4/2006 | Lee et al. |
| 7,043,488 B1 | 5/2006 | Bauer et al. |
| 7,080,094 B2 | 7/2006 | Dapp et al. |
| 7,089,239 B1 | 8/2006 | Baer et al. |
| 7,089,567 B2 | 8/2006 | Girardot et al. |
| 7,139,746 B2 | 11/2006 | Shin et al. |
| 7,143,397 B2 | 11/2006 | Imaura |
| 7,162,485 B2 | 1/2007 | Gottlob et al. |
| 7,171,407 B2 | 1/2007 | Barton et al. |
| 7,174,354 B2 * | 2/2007 | Andreasson ............. 1/1 |
| 7,406,522 B2 | 7/2008 | Riddle |
| 7,451,128 B2 | 11/2008 | Song et al. |
| 7,523,119 B2 | 4/2009 | Imamura et al. |
| 7,788,654 B2 | 8/2010 | Kostoulas et al. |
| 7,831,903 B2 | 11/2010 | Heuer et al. |
| 2002/0056025 A1 | 5/2002 | Qiu et al. |
| 2002/0073019 A1 | 6/2002 | Deaton |
| 2002/0078068 A1 | 6/2002 | Krishnaprasad et al. |
| 2002/0116371 A1 | 8/2002 | Dodds et al. |
| 2002/0116457 A1 | 8/2002 | Eshleman et al. |
| 2002/0133484 A1 | 9/2002 | Chau et al. |
| 2002/0143512 A1 | 10/2002 | Shamoto et al. |
| 2002/0156811 A1 | 10/2002 | Krupa |
| 2002/0184188 A1 | 12/2002 | Mandyam et al. |
| 2002/0184401 A1 | 12/2002 | Kadel, Jr. et al. |
| 2003/0004937 A1 | 1/2003 | Salmenkaita et al. |
| 2003/0009361 A1 | 1/2003 | Hancock et al. |
| 2003/0033287 A1 | 2/2003 | Shanahan et al. |
| 2003/0065659 A1 | 4/2003 | Agarwal et al. |
| 2003/0078906 A1 | 4/2003 | Ten-Hove et al. |
| 2003/0093672 A1 | 5/2003 | Cichowlas |
| 2003/0101194 A1 | 5/2003 | Rys et al. |
| 2003/0140308 A1 | 7/2003 | Murthy et al. |
| 2003/0172135 A1 | 9/2003 | Bobick et al. |
| 2003/0182624 A1 | 9/2003 | Large |
| 2003/0212662 A1 | 11/2003 | Shin et al. |
| 2003/0212664 A1 | 11/2003 | Breining et al. |
| 2003/0236903 A1 | 12/2003 | Piotrowski |
| 2004/0010752 A1 | 1/2004 | Chan et al. |
| 2004/0043758 A1 | 3/2004 | Sorvari et al. |
| 2004/0044659 A1 | 3/2004 | Judd et al. |
| 2004/0064466 A1 | 4/2004 | Manikutty et al. |
| 2004/0088320 A1 | 5/2004 | Perry |
| 2004/0132465 A1 | 7/2004 | Mattila et al. |
| 2004/0143791 A1 | 7/2004 | Ito et al. |
| 2004/0148278 A1 | 7/2004 | Milo et al. |
| 2004/0172599 A1 | 9/2004 | Calahan |
| 2004/0176958 A1 | 9/2004 | Salmenkaita et al. |
| 2004/0186841 A1 | 9/2004 | Heuer et al. |
| 2004/0220912 A1 | 11/2004 | Manikutty et al. |
| 2004/0221229 A1 | 11/2004 | Perry |
| 2004/0225680 A1 | 11/2004 | Cameron et al. |
| 2004/0230667 A1 | 11/2004 | Wookey |
| 2004/0260691 A1 | 12/2004 | Desai et al. |
| 2004/0261019 A1 | 12/2004 | Imamura et al. |
| 2004/0267760 A1 | 12/2004 | Brundage et al. |
| 2005/0033733 A1 | 2/2005 | Shadmon et al. |
| 2005/0050016 A1 | 3/2005 | Stanoi et al. |
| 2005/0050058 A1 | 3/2005 | Jain et al. |
| 2005/0050092 A1 | 3/2005 | Jain et al. |
| 2005/0091188 A1 | 4/2005 | Pal et al. |
| 2005/0091588 A1 | 4/2005 | Ramarao et al. |
| 2005/0097084 A1 | 5/2005 | Balmin et al. |
| 2005/0102256 A1 | 5/2005 | Bordawekar et al. |
| 2005/0203957 A1 | 9/2005 | Wang et al. |
| 2005/0228792 A1 | 10/2005 | Chandrasekaran et al. |
| 2005/0228818 A1 | 10/2005 | Murthy et al. |
| 2005/0228828 A1 | 10/2005 | Chandrasekar et al. |
| 2005/0278289 A1 | 12/2005 | Gauweiler et al. |
| 2005/0278616 A1 | 12/2005 | Eller |
| 2005/0289125 A1 | 12/2005 | Liu et al. |
| 2006/0005122 A1 | 1/2006 | Lemoine |
| 2006/0021246 A1 | 2/2006 | Schulze et al. |
| 2006/0036631 A1 | 2/2006 | Cheslow |
| 2006/0047646 A1 | 3/2006 | Maluf et al. |
| 2006/0047717 A1 | 3/2006 | Pereira |
| 2006/0059165 A1 | 3/2006 | Bosloy et al. |
| 2006/0129584 A1 | 6/2006 | Hoang et al. |
| 2006/0136761 A1 * | 6/2006 | Frasier et al. ............. 713/320 |
| 2006/0200439 A1 | 9/2006 | Bhatia et al. |
| 2006/0212467 A1 | 9/2006 | Murthy et al. |
| 2006/0236224 A1 | 10/2006 | Kuzneltsov et al. |
| 2006/0277289 A1 | 12/2006 | Bayliss et al. |
| 2007/0043702 A1 | 2/2007 | Lakshminarayanan et al. |
| 2007/0043751 A1 | 2/2007 | Chen et al. |
| 2007/0050704 A1 | 3/2007 | Liu |
| 2007/0113221 A1 * | 5/2007 | Liu et al. .................. 717/143 |
| 2007/0208752 A1 | 9/2007 | Khaladkar et al. |
| 2007/0260571 A1 | 11/2007 | Mansfield et al. |
| 2008/0082484 A1 | 4/2008 | Averbuch et al. |
| 2008/0091623 A1 | 4/2008 | Idicula et al. |
| 2008/0098001 A1 | 4/2008 | Gupta et al. |
| 2008/0098019 A1 | 4/2008 | Sthanikam et al. |
| 2008/0098020 A1 | 4/2008 | Gupta et al. |
| 2008/0120351 A1 * | 5/2008 | Khaladkar et al. ......... 707/204 |
| 2008/0120608 A1 | 5/2008 | Shetty et al. |
| 2009/0112890 A1 | 4/2009 | Medi et al. |
| 2009/0150412 A1 | 6/2009 | Idicula et al. |
| 2009/0216715 A1 | 8/2009 | Dexter |
| 2009/0307239 A1 | 12/2009 | Chandrasekar et al. |

FOREIGN PATENT DOCUMENTS

| | | | |
|---|---|---|---|
| WO | WO 01/59602 A1 | 8/2001 |
| WO | WO 01/61566 A1 | 8/2001 |
| WO | WO 03107576 A2 | 12/2003 |
| WO | WO 2006026534 A2 | 3/2006 |

OTHER PUBLICATIONS

Xiaogang Li, Agrawal, "Efficient Evaluation of XQuery over Streaming Data", 2005, 31st VLDB Conference, pp. 265-276.
IBM Research, "XAOS: An Algorithm for Streaming XPath Processing with Forward and Backward Axes" 2003, pp. 1-2.
Zhang, et al., "TDX: A High Performance Table-driven XML Parser", In proceedings of the 44th annual (ACM) Southeast Regional Conference, Mar. 2006, ACM, 6 pages.
Balmin et al., "Incremental Validation of XML Documents", ACM Trans. Database System 24, Dec. 2004, 42 pages.
Bayardo et al., "An Evaluation of Binary XML Encoding Optimizations for Fast Stream Based XML Processing" *WWW2004* 10 pages.
"Binary XML Library" downloaded from the Internet Aug. 6, 2007 <http://www.smos.esa.int/BinaryXML/ > 2 pages.
Bruce, "CubeWerx Position Paper for Binary XML Encoding" (10 pages).
Chakraborty, Krishnendu, "The XML Garbage Collector", The Source for Developers, Sun Developer Network Site XP-002297849, Mar. 2002.
Chen, Ruey-Shun et al., "Developing an XML framework for metadata system", Trinity College Dublin, Proc. of the 1st Inter. Sympo. on Information and Communication, pp. 267-272.
Cheng, Josephine et al., "IBM DB2 XML Extender," IEEE, ICDE '00 Conference, San Diego, Feb. 2000, 128 pages.
"EE XML/Binary CFI File Handling Library User Manual" downloaded from the Internet <http://www.smos.esa.int/BinaryXML/SO-UM-DME-LIPP-0005-BINSML-FH-SUM-E2-RO.pdf > 49 pages.
Liefke et al., "Xmill: an efficient compressor for XML data", May 2000, ACM SIGMOD Record, Proceedings of the 2000 ACM SIGMOD international conference on Management of data SIGMOD 00', vol. 29 Issue 2, Publisher: ACM Press, 12 pages.
Liu et al., "XML retrieval: Configurable indexing and ranking for XML information retrieval", Jul. 2004, Proceedings of the 27th annual international ACM SIGIR conference on Research and development in information retrieval SIGIR 04', Pulished by ACM press, 12 pages.
Lo et al., "XAS: A System for Accessing Componentized, Virtual XML Documents," IEEE, 2001, pp. 493-502.
Manolescu, Dragos, Review of "Metadata solutions: using metamodels, repositories, XML, and enterprise portals to generate information on demand by Adrienne Tannenbaum", Mar. 2003, ACM Press, vol. 28, Issue 2, p. 38.
Martin et al., "WAP Binary XML Content Format" downloaded from the Internet Aug. 6, 2007 < http://www.w3.org/TR/wbxml/ > 15 pages.
Min et al., "XML Indexing and compression: XPRESS: a queriable compression for XML data", Jun. 2003, Proceedings of the 2003 ACM SIGMOD international conference on Management of data SIGMOD 03', Published by ACM Press, 8 pages.
Myllymaki, Jussi, "Effective Wed data Extraction with Standard XML Technologies," WWW10, May 1-5, 2001, pp. 689-696.
Noser, Hansrudi, et al., "Dynamic 3D Visualization of Database-Defined Tree Structures on the WWW by Using Rewriting Systems," 2000, IEEE, XP-002262516, pp. 247-254.
Oracle XML DB Developer's Guide 11gR1, Oct. 2007, http://download.oracle.com/docs/cd/B28359_01/appdev.111/b28369.pdf.
PCT/US2007/010163, Notification of Transmittal of the International Search Report and the Written Opinion of the International Searching Authority, Oct. 12, 2007, 12 pages.
Peng, Feng et al., "XPath queries on streaming data" (2003) *ACM Press*, pp. 431-442.
Schmidt et al., "Why and How to Benchmark XML Databases," SIGMOND Record, vol. 3, No. 3, Sep. 2001, pp. 27-32.
Vion-Dury, Jean-Yves, "XPath on left and right sides of rules: toward compact XML tree rewriting through node patterns" (2003) *ACM Press*, pp. 19-25.
Vorthmann, S. et al. "Beyond Schemas, Schema Adjuncts and the Outside World," Markup Languages, Online!, vol. 2, No. 3, Jun. 2000, pp. 1-8.
Yoshikawa, Masatoshi et al., "XRel: A Path-Based Approach to Storage and Retrieval of XML Documents Using Relational Databases", XP-001143686, *ACM Transactions on Internet Technology* (2001), pp. 110-141.
"Zapthink" downloaded from the Internet Aug. 6, 2007 < http://www.zapthink.com/report.html?id=ZAPFLASH-11162004 > 3 pages.
Zisman et al., "Using XML to Build Consistency Rules for Distributed Specifications," Proceedings of the Tenth International Workshop on Software Specification and Design (IWSD'00), IEEE 2000, 8 pages.
Zou et al., "XML Processing: Ctree: a compact tree for indexing XML data" Nov. 2004, Proceedings of the 6th annual international workshop on Web information and data management WIDM 04', Published by ACM Press, 10 pages.
L. Fegaras, D. Levine, S. Bose, and V. Chaluvadi, "Query Processing of Streamed XML Data," 11th Int'l Conf. Information and Knowledge Management, Nov. 2002, 8 pages.
W3C, XML Schema Part 0: Primer, W3C Recommendation, dated May 2, 2001, Editor: David C. Fallside, Copyright 2001, 54 pages.

* cited by examiner

TECHNIQUES FOR MORE EFFICIENT GENERATION OF XML EVENTS FROM XML DATA SOURCES

CROSS-REFERENCE TO RELATED APPLICATIONS

This application is related to U.S. patent application Ser. No. 11/716,505, filed Mar. 8, 2007, entitled "Technique To Estimate The Cost Of Streaming Evaluation Of XPaths," by Idicula et al; U.S. patent application Ser. No. 11/729,943, filed Mar. 28, 2007, entitled "Validation Of XML Content In A Streaming Fashion," by Medi et al; and U.S. patent application Ser. No. 11/743,563, filed May 2, 2007, entitled "TECHNIQUES FOR EFFICIENT LOADING OF BINARY XML DATA," by Gupta et al., the entire contents of which are hereby incorporated by reference for all purposes as if fully set forth herein.

FIELD OF THE INVENTION

Embodiments of the invention described herein relate generally to the processing of extensible markup language (XML), and, more specifically, to techniques for more efficient generation of XML events while processing XML data sources.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Database systems often store within their databases XML-formatted data. This data may come from a variety of sources, though the source is often an XML document or a database object.

In XML, data items, known as elements, are delimited by an opening tag and a closing tag. An element may also comprise attributes, which are specified in the opening tag of the element. Text between the tags of an element may represent any sort of data value, such as a string, date, or integer.

Text within an element may alternatively represent one or more elements. Elements represented within the text of another element are known as subelements or child elements. Elements that store subelements are known as parent elements. Since subelements are themselves elements, subelements may, in turn, be parent elements of their own subelements. The resulting hierarchical structure of XML-formatted data is often discussed in terms akin to those used to discuss a family tree. For example, a subelement is said to descend from its parent element or any element from which its parent descended. A parent element is said to be an ancestor element of any subelement of itself or of one of its descendant element. Collectively, an element along with its attributes and descendants, are often referred to as a tree or a subtree.

Applications or application components that utilize XML data often feature processes that generate XML events. Some processes that generate XML events include XML parsing and validation, as discussed in "Validation Of XML Content In A Streaming Fashion," incorporated above. As another example, an application that searches XML data might implement a process for evaluating a certain XPath expression by streaming XML events from documents within a search corpus to a state machine representation of the expression. Such a process is discussed in, for example, "Technique To Estimate The Cost Of Streaming Evaluation Of XPaths," incorporated above.

These event-generating processes commonly entail parsing through XML-formatted data linearly and generating XML events upon recognizing certain tokens. For example, an event-generating process may generate events upon recognizing either a beginning tag for an element or an attribute of an element.

In order to properly parse through XML data, an event-generating process may require a mechanism whereby an implementing component may determine information about the current state of the process (i.e., what events it has already generated, what tokens it has already seen, what characters it has encountered since it last generated an XML event, and so on). To "remember" this state information, an event-generating process will typically entail creating a number of memory buffers. Memory buffers may also be created during an event-generating process for reasons other than remembering state information.

Memory requirements for XML data vary throughout an event-generating process according to factors such as the structure of the XML data, the location of the currently processed element within that structure, and the data itself. These factors are typically not known up front, meaning that any given XML data source could require any number of memory buffers of any size. Because the number of memory buffers that will be required for an XML data source is unknown, an event-generating process requires creating those buffers only as needed during the event-generating process.

Many database systems binary-encode XML data sources. Many event-generating processes must therefore entail decoding binary-encoded XML before generating an XML event. Thus, some components that implement event-generating processes are described as XML decoders. Decoding requires additional memory resources. For example, to decode a binary-encoded XML data source, an event-generating process may require simultaneously traversing an XML schema upon which the binary-encoding was based. A large number of memory buffers may be required to assist traversal of the schema. Further discussion of handling binary-encoded XML may be found in "TECHNIQUES FOR EFFICIENT LOADING OF BINARY XML DATA," as incorporated above.

Creating a new memory buffer in an event-generating process requires requesting that the system memory manager allocate a space (or "chunk") in system memory for that buffer. This may be an extension of a chunk allocated for another memory buffer, or an entirely new chunk. Also, event-generating processes typically release buffers when they are no longer needed (e.g. when a process has completed parsing a subtree), thus resulting in an equal number of requests for deallocation of memory chunks.

Because of the complexity of system memory management, allocating and deallocating memory from the system is expensive in terms of CPU utilization. This expense adds up quickly for large and/or complex XML documents, which may require hundreds of thousands of allocations and deallocations as they result in the parsing of a large number of elements.

It is therefore desirable to provide techniques and apparatuses that more efficiently generate XML events from XML data.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
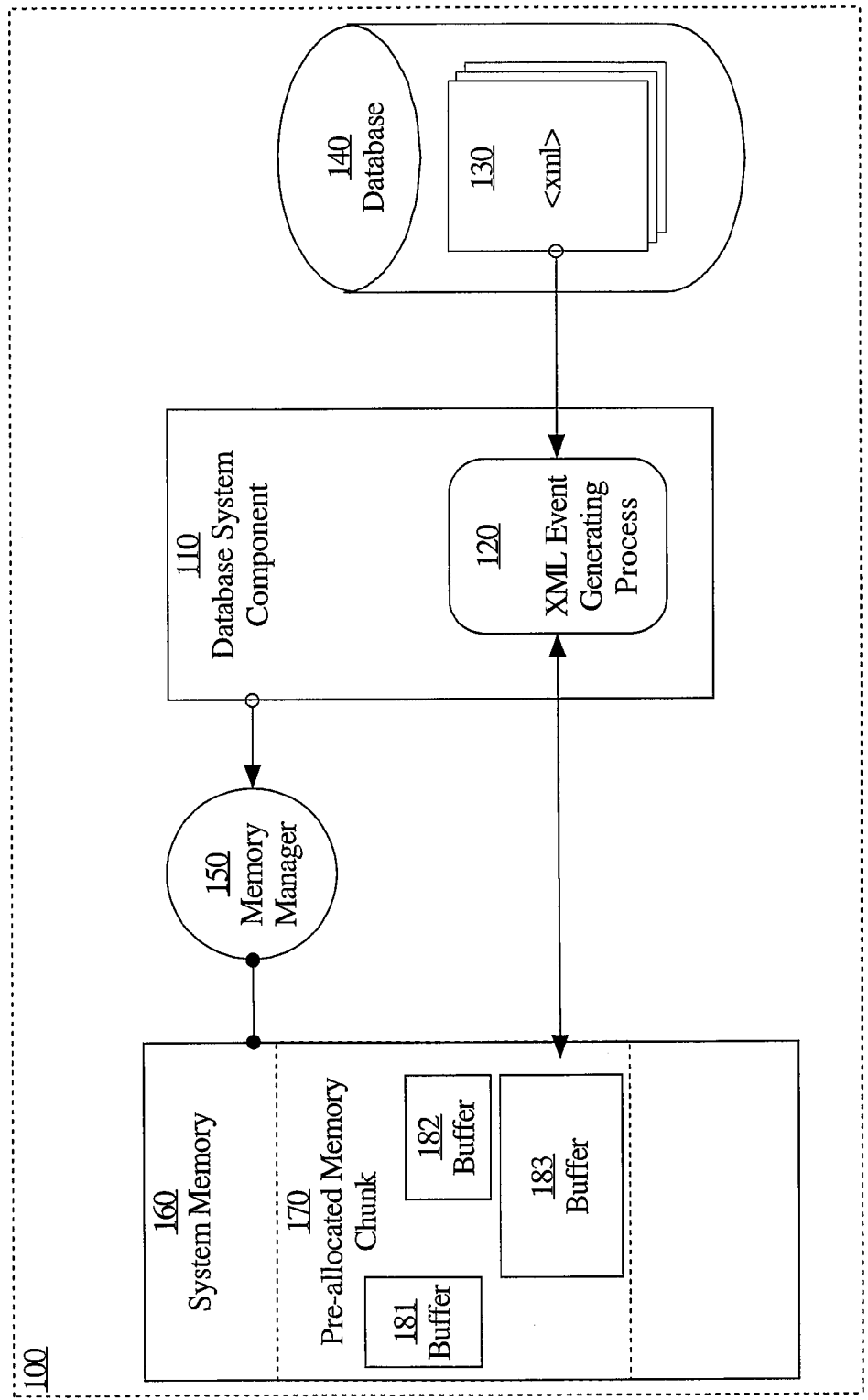
FIG. 1 is a block diagram that illustrates a database system in which an embodiment of the invention may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0. General Overview

Approaches, techniques, and mechanisms are disclosed for efficiently generating XML events from an XML data source. According to an embodiment of the invention, one may increase the efficiency of an XML event-generating process by reducing the number of requests to allocate or deallocate system memory. Such reduction may occur as the result of pre-allocating a memory chunk of sufficient size to contain all of the memory buffers required by a particular event-generating process. Instead of allocating new memory chunks for new memory buffers, an application may store any required buffers within the pre-allocated memory chunk. Furthermore, an application may re-use buffers during the process or between different iterations of the process, thus avoiding the need to deallocate and reallocate memory that is essentially being used for the same purpose.

According to an embodiment, an application may employ streamlined memory management techniques to determine how to store memory buffers within a pre-allocated memory chunk. The application does not need to provide the features and safeguards of a system memory manager, as the memory chunk is used only for very limited purposes. Thus, determining where to store a memory buffer within a pre-allocated memory chunk consumes significantly less resources than allocating a space for the memory buffer from main memory.

According to an embodiment, an application determines a default memory size for an XML event-generating process using one of a variety of techniques disclosed in this application. The application then requests allocation of a memory chunk from a system memory manager, such as one provided by an operating system or database system. The size of the allocated memory chunk is the default memory size. The application then begins processing an XML data source using the event-generating process. During the event-generating process, memory buffers are created in the memory chunk as needed. At the same time, the application generates one or more XML events. At the end of the event-generating process, the memory chunk is deallocated.

According to an embodiment, an application uses the event-generating process to process multiple XML data sources. The same memory chunk is used for each execution of the event-generating process. The memory chunk is only deallocated after all of the XML data sources have been processed.

According to an embodiment, the event-generating process is associated with a state machine. The state machine is a compiled representation of an XPath expression being evaluated by the database system in response to an XML query. As part of the event-generating process, the state machine requests XML events from an XML decoder. The XML decoder generates the XML events based on XML data sources targeted by the XPath statement.

According to an embodiment, an application may determine a memory chunk size sufficient enough to store all or most of the buffers required during an event-generating process by analyzing memory usage while executing the process on a training set of XML documents. Alternatively, a default memory size may be configured by a user. A variety of other algorithms might also be employed to estimate a default memory size.

According to an embodiment, an application may adaptively adjust the size of a memory chunk used for multiple iterations of an event-generating process. The application processes a first data source in a plurality of data sources using the event-generating process. While processing the first data source, the application allocates a memory chunk to store memory buffers used during the processing of the first data source. The application processes subsequent data sources. If a subsequent data source requires memory buffers in excess of what may be stored in the memory chunk, the memory chunk may be expanded to fit the additional memory buffers.

In other aspects, the invention encompasses a computer apparatus and a computer-readable medium configured to carry out the foregoing steps.

2.0. Structural Overview

2.1. General Overview

FIG. 1 is a block diagram that illustrates a database system 100 in which an embodiment of the invention may be practiced. Database system 100 comprises a component 110. Component 110 may be, for example, any application, application component, interface, program unit, or other feature provided by database system 110 that must, in the course of execution, generate XML events from an XML data source.

Component 110 features an XML event-generating process 120. Event-generating process 120 is any process that generates XML events from data sources inside XML data collection 130.

Event-generating process 120 interfaces with XML data collection 130 via database 140. XML data collection 130 may comprise all XML documents in database 140. Alternatively, XML data collection 130 may comprise a subset of XML data sources in database 140. For example, this subset may comprise those data sources that are defined by a particular schema. Or, the subset may comprise those data sources that are implicated by particular query or XPath expression for which component 110 has called process 120.

Data collection 130 also may span multiple databases, or may reside in files on disk instead of in database 140.

Database system 100 also comprises memory manager 150, which manages system memory 160. Alternatively, memory manager 150 may be provided by an operating system on which database system 100 runs.

System memory 160 comprises memory chunk 170. Memory chunk 170 has been allocated from system memory 160 by memory manager 150 in response to a request by component 110. Component 110 uses memory chunk 170 for storing memory buffers required by event-generating process 120.

Thus, memory chunk 170 comprises memory buffers 181, 182, and 183. Memory buffers 181, 182, and 183 store state information and other data to assist event-generating process 120 as it linearly traverses XML data sources from data collection 130. For example, memory buffer 181 may store a stack trace for a currently processed XML subtree, such as names, associated states, and namespace prefix definitions for a set of ancestor nodes. As another example, memory buffer 182 may store information about character set conversion.

Component 110 determines where in memory chunk 170 memory buffers 181, 182, and 183 are stored. Memory buffers 181, 182, and 183 may be created and discarded at any time during event-generating process 120. They may also be re-used for similar purposes. Component 110 may create additional memory buffers for event-generating process 120. It may also create fewer memory buffers.

According to one embodiment, component 110 may comprise many event-generating processes that interface with different XML data collections. For each event-generating process, component 110 may define a different memory chunk. For instance, database 140 may comprise XML data collections based on a variety of schemas. For each schema, component 110 may comprise a different event-generating process that stores its buffers in a different memory chunk. Component 110 may determine the size of each memory chunk differently—thus a process for a simple schema might have a small memory chunk, while a process for a more complex schema might have a large memory chunk.

2.2. Exemplary System (XPath Evaluation)

Figure 2:
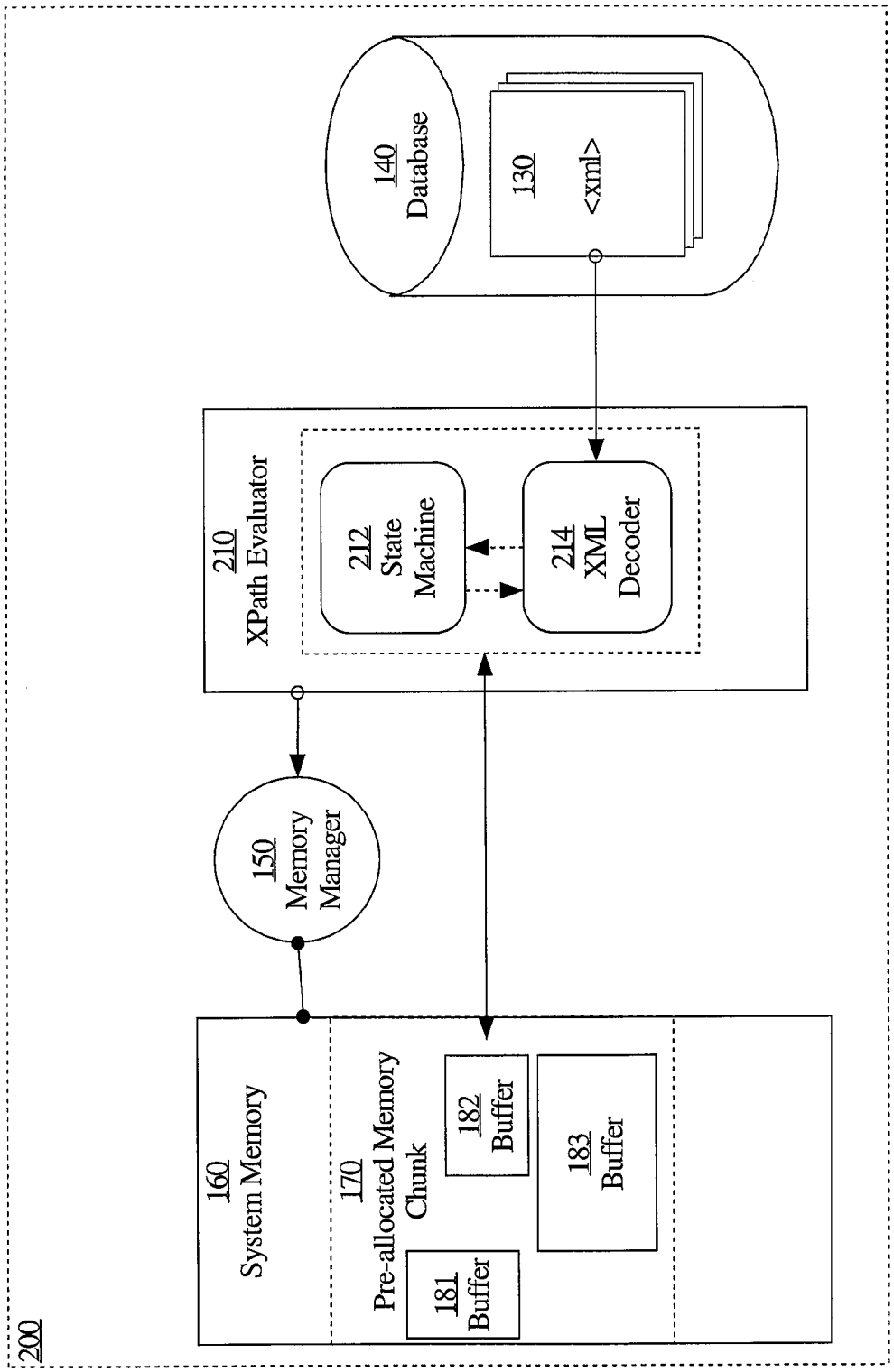
FIG. 2 is a block diagram that illustrates a database system with an XPath evaluator, in which database system an embodiment of the invention may be practiced.

FIG. 2 is a block diagram that illustrates a database system 200 with an XPath evaluator, in which database system an embodiment of the invention may be practiced. Database system 200 is an exemplary version of database system 100. Thus, its data collection 130, database 140, memory manager 150, system memory 160, memory chunk 170, and memory buffers 181, 182, and 183 are like those found in database system 100.

Database system 200 comprises an XPath evaluator 210. XPath evaluator 210 is an example of a component 110 from FIG. 1.

Database system 200 uses XPath evaluator 210 to evaluate XPath expression 290. XPath expression 290 is to be evaluated with respect to XML data in XML data collection 130. XPath expression 290 may have been received, for example, in an XML query from clients that interface with database system 200. As another example, database system 200 may evaluate XPath expression 290 internally as part of another operation that it is performing.

XPath evaluator 210 may comprise several components, including state machine 212 and XML decoder 214. State machine 212 is a compiled representation of XPath expression 290. XPath evaluator 210 created state machine 212 specifically for evaluating XPath statement 290.

At the request of state machine 212, XML decoder 214 streams XML events to XPath evaluator 210. XML decoder 214 inputs XML data from XML data collection 130 and generates XML events based on the inputted data. Although depicted as such, XML decoder need not necessarily be a component of XPath evaluator 210. For example, database system 200 may provide XML decoder 214 as a separate component. XPath evaluator 210 may interface with XML decoder 214 instead of providing a separate XML decoding component. Also, XML decoder 214 may itself comprise several components that generate XML events, such as an XML parser and an XML validator.

XPath evaluator 210 created memory chunk 160 specifically for the purpose of storing memory buffers required by state machine 212 and XML decoder 214. For example, as it reads an XML document from data collection 130, XML decoder 214 may encounter a tag such as <PurchaseOrder>. In response to recognizing this tag, XML decoder 214 may send an XML event to state machine 212 indicating the start of a PurchaseOrder element. XML decoder 214 may then create a memory buffer in memory chunk 170, such as memory buffer 181, to store state information indicating that it is currently inside the PurchaseOrder element. XML decoder 214 may then continue evaluating the XML document. Thus, the evaluation of a specific document using state machine 212 and XML decoder 214 is an example event-generating process 120.

According to an embodiment, memory chunk 160 is used for XML decoder 214 only when generating XML events that are used by state machine 212. For example, XPath evaluator 210 may comprise other state machines compiled from other XPath expressions. XPath evaluator 210 may create other memory chunks for use with the other state machines. XML decoder 214 would use these other memory chunks when generating XML events that are used by the other state machines. In other words, XPath evaluator 210 may comprise multiple event-generating processes implemented by multiple state machines that make use of the same XML decoder.

According to an embodiment, memory chunk 160 is allocated when state machine 212 is compiled. It may be allocated to a default memory size using a technique described in section 4.1, or it may be adaptively adjusted upwards in size, as discussed in section 4.2.

According to an embodiment, XML data collection 130 comprises binary-encoded XML. XML decoder 214 decodes the binary-encoded XML before generating XML events. This decoding requires additional memory buffers in memory chunk 170 to, for example, traverse an XML schema in parallel to the XML data sources from data collection 130.

3.0. Functional Overview 3.1. Using a Pre-Allocated Memory Chunk

Figure 3:
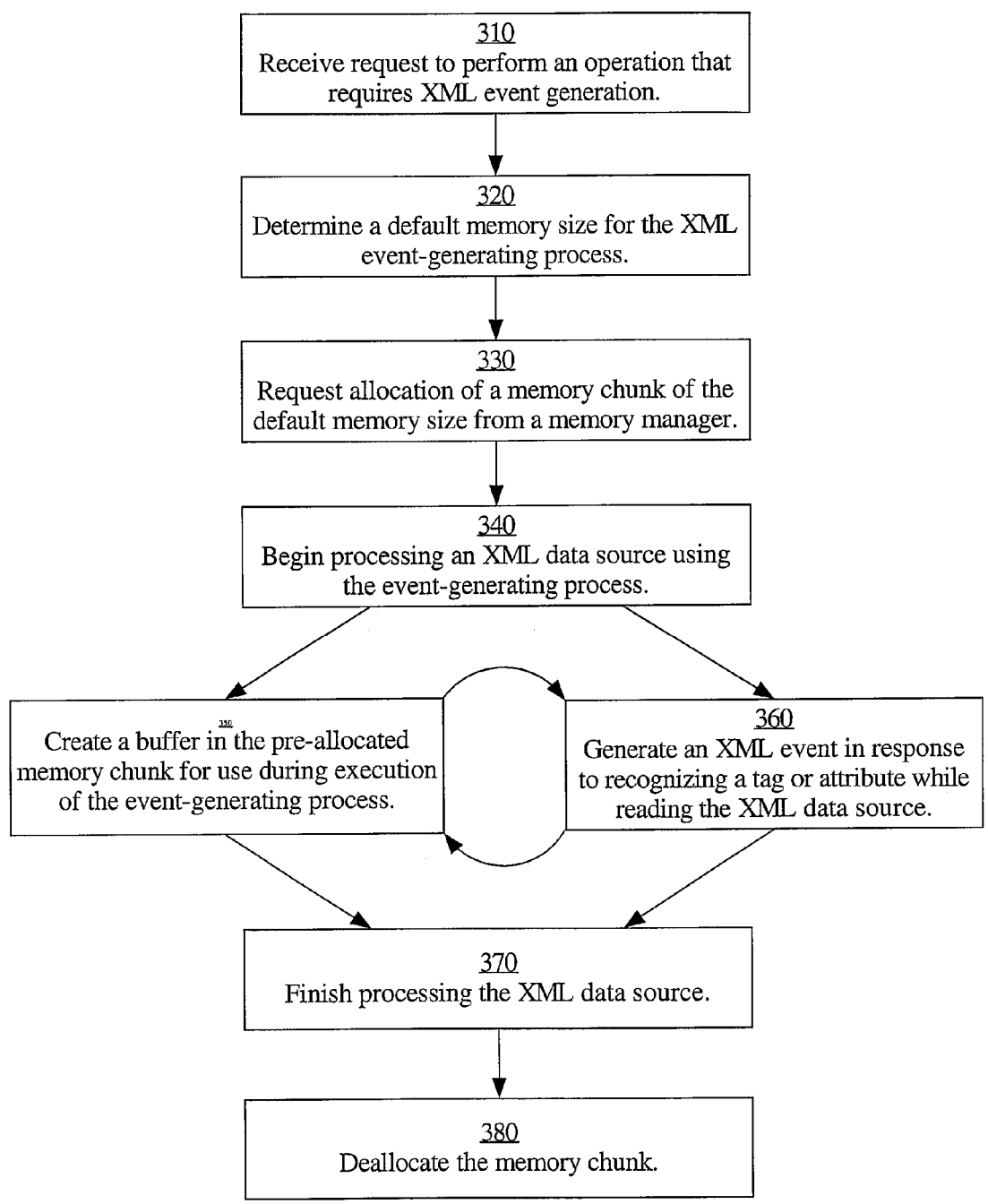
FIG. 3 depicts a flow diagram that illustrates a method for utilizing a pre-allocated memory chunk to store memory buffers while generating XML events according to an embodiment of the invention.

FIG. 3 depicts a flow diagram 300 that illustrates a method for utilizing a pre-allocated memory chunk to store memory buffers while generating XML events according to an embodiment of the invention.

In step 310, a database system component, such as component 110 or XML evaluator 210, receives a request to perform an operation with respect to one or more XML data sources. The component features a process for generating XML events, which process is used in performance of the operation. The process may be, for example, process 120 or an evaluation of a document from data collection 130 using state machine 212 and XML decoder 214.

For example, the component may have received a request to stream a textual representation of a binary-encoded XML data source. The component may respond with a stream of XML events generated from the one or more XML data sources. As another example, the component may have been asked to produce an XML result set in response to a query against the one or more documents.

In step 320, the component determines a default memory size for the XML event-generating process. Determining a default memory size is discussed in section 4.1.

In step 330, the component requests from a memory manager, such as memory manager 150, allocation of a memory chunk of the default memory size. The component will use this memory chunk (i.e. the "pre-allocated memory chunk") for the afore-mentioned event-generating process.

In step 340, the component begins processing an XML data source using the event-generating process. As part of this step, the component begins receiving, as input, the XML data source from a database, such as database 140. The component may, for example, receive the XML data source all at once. The database may, on the other hand, stream the XML data source linearly to the component. In either case, the component will begin reading this data source linearly.

In step 350, the component creates a buffer for use during execution of the event-generating process. It may, for example, create this buffer in response to recognizing that it is beginning to read a new subtree in the XML data source. It may store in this buffer state information to help it remember where, structurally-speaking, it is in its processing of the document. There are a variety of other purposes for which this buffer may be used. For example, the component may instead store in this buffer information about the corresponding element definition in the schema for this XML data source.

The buffer is created in the pre-allocated memory chunk. The component may use known memory-management techniques to determine where to locate the buffer in the pre-allocated chunk.

In step 360, the component generates an XML event in response to recognizing a tag or attribute while reading the XML data source. Steps 350 and 360 may occur repeatedly and concurrently throughout the processing of the XML data source.

In step 370, the component finishes processing the XML data source.

In step 380, the component deallocates the pre-allocated memory chunk.

Reusing Buffers For Similar Purposes

According to an embodiment, buffers may be re-used during an event-generation process for similar purposes. For example, the component may categorize each buffer based upon its use. It may reuse a buffer that is in the same category of use. This may increase the efficiency of, for example, a buffer used for character set conversions. As another example, a buffer may be reused for sibling subtrees, where it is known that each sibling is of the same size or structure.

According to an embodiment wherein the memory chunk is used for multiple executions of the same event-generating process (e.g. for processing multiple documents), buffers may also be re-used between iterations. So, for example, a memory buffer for character set conversions may be reused for multiple documents.

3.2. Re-Using the Memory Chunk for Multiple Data Sources

Figure 4:
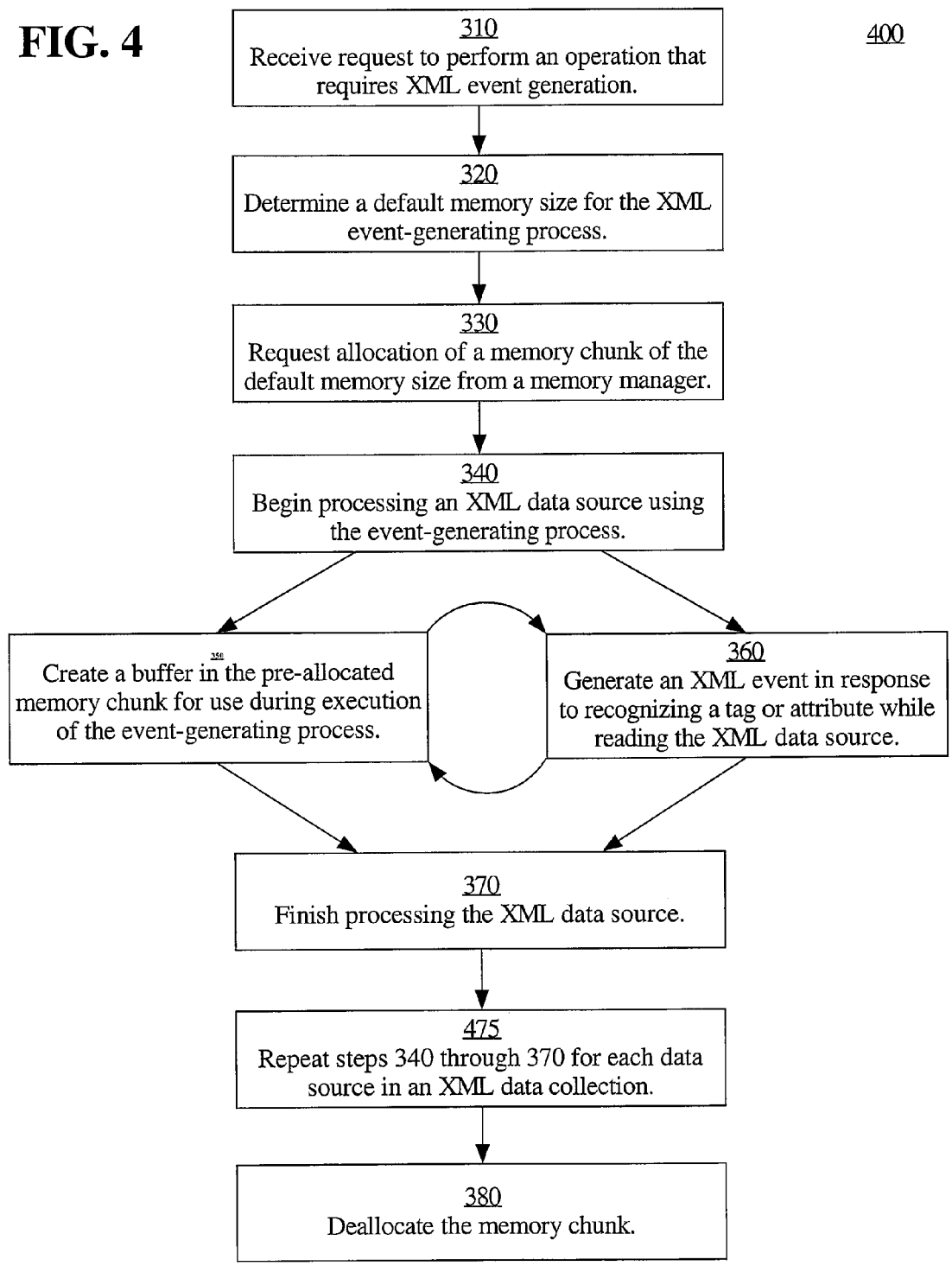
FIG. 4 depicts a flow diagram that illustrates a method for utilizing a pre-allocated memory chunk to store memory buffers while generating XML events from multiple data sources according to an embodiment of the invention.

FIG. 4 depicts a flow diagram 400 that illustrates a method for utilizing a pre-allocated memory chunk to store memory buffers while generating XML events from multiple data sources according to an embodiment of the invention.

Flow diagram 400 is similar to flow diagram 300, with the addition of step 475. In step 475, steps 340 through 370 are repeated for each data source in an XML data collection, such as data collection 130. This data collection may be the same as the one or more XML data sources with respect to which the component was asked to perform an operation in step 310. Thus, the memory chunk is reused for all data sources that are evaluated using the event-generating process.

4.0. Implementation Examples 4.1. Determining a Default Memory Size

According to an embodiment, the default memory size may be large enough to store all memory buffers required by the event-generating process. Since a size sufficient to accomplish this goal is not known up front, the component may employ a variety of techniques to estimate a default memory size. For example, the component may run the process through a training set of XML documents. Alternatively, a user may specify a default size. Alternatively, the database system may calculate a default size based on characteristics of the XML data collection that the process evaluates, such as average tree depth or information gathered from an XML schema. Variations on the techniques described in "Technique To Estimate The Cost Of Streaming Evaluation Of XPaths," incorporated above, may be useful in estimating a default memory size for event-generating processes that are associated with an XPath expression.

According to an embodiment, the default memory size need not necessarily be large enough for all memory buffers required each time the event-generating process is executed. There are still advantages to using a pre-allocated memory chunk for just some of the buffers used during the process. If an instance of a process requires more memory than has been pre-allocated (as might occur for an extraordinarily complex or large document), the component may simply allocate more memory for each additional buffer. This memory may be added to the pre-allocated memory chunk, as discussed in section 4.2, or it may be returned to the system after execution of the current instance completes.

Training Sets

According to an embodiment, an event-generating process may be designed for use with a large number of documents in a document collection. Prior to using a pre-allocated memory chunk, a component may execute the event-generating process on a training set of documents, wherein each memory buffer requires allocation of a new memory chunk. The training set may, for example, comprise the first few documents of the document collection. Or the training set may comprise documents that are typical of those in the document collection. For example, the training set may be a set of documents based on the same schema or matching the same query criteria as those in the document collection.

The component may monitor the amount of memory allocated for each document. It may then calculate a default memory size based on the mean amount of memory allocated per document. It may also incorporate information about the standard deviation in the amount of memory allocated per document. For example, it may calculate the default memory size to be the mean of, plus three times the standard deviation in, the amount of memory allocated per document.

After calculating a default memory size based on the training set, the remainder of the documents in the document collection may be processed according to the techniques described above.

4.2. Adaptively Adjusting the Memory Chunk Size

According to an embodiment, a pre-allocated memory chunk may be expanded (i.e. reallocated to a new size) when certain iterations of an event-generation process require additional memory for memory buffers. The memory chunk remains at this new size for future iterations of the process. Although this technique may result in increased allocation calls at the beginning of processing a document collection, the memory chunk size should quickly stabilize at an optimal size.

Figure 5:
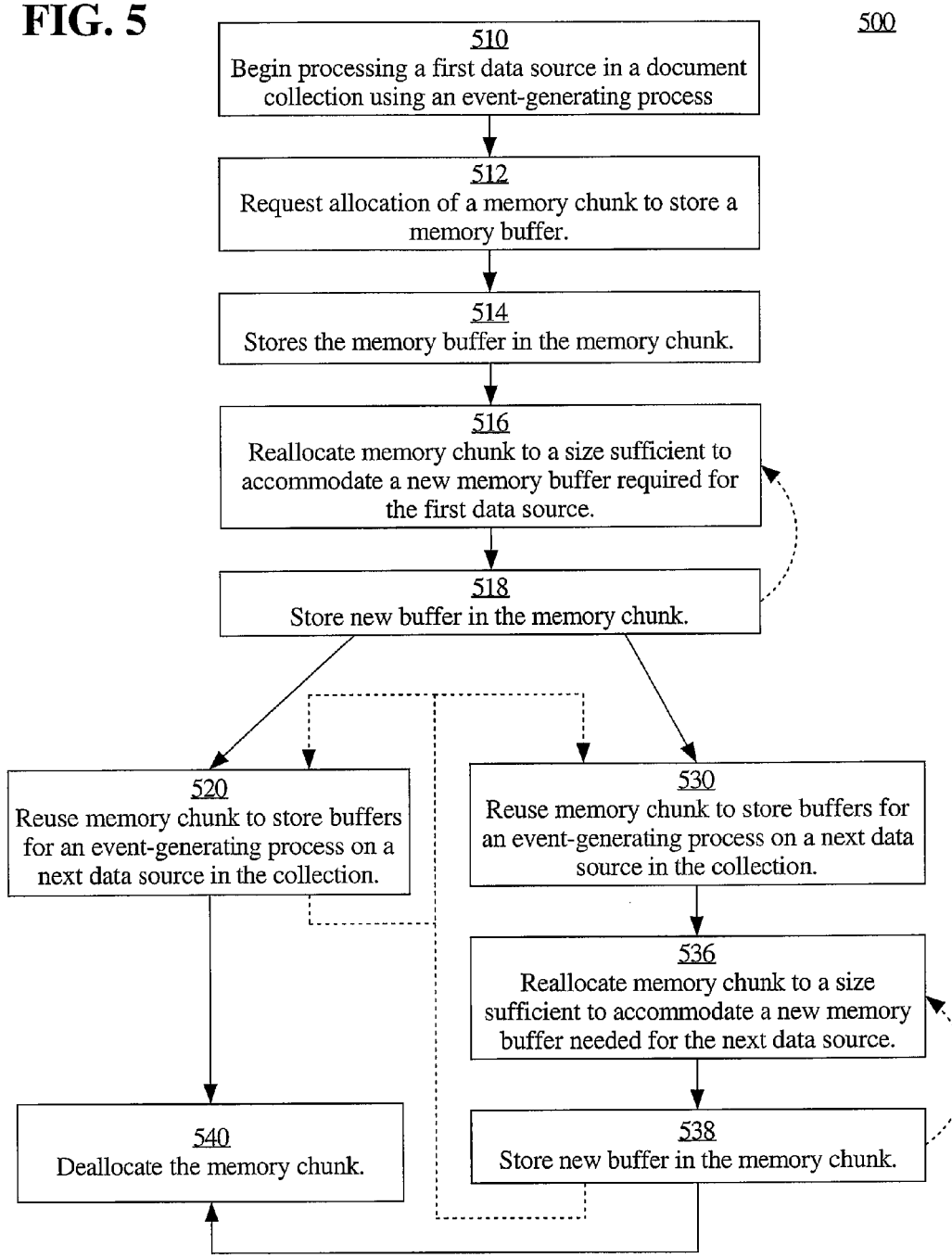
FIG. 5 depicts a flow diagram that illustrates a method for adaptively adjusting a pre-allocated memory chunk that stores memory buffers while generating XML events from multiple data sources according to an embodiment of the invention.

FIG. 5 depicts a flow diagram 500 that illustrates a method for adaptively adjusting a pre-allocated memory chunk that stores memory buffers while generating XML events from multiple data sources according to an embodiment of the invention.

In step 510, a component, such as component 110, begins processing a first data source in a document collection, such as document collection 130, using an event-generating process, such as process 120.

In step 512, as a result of requiring a memory buffer, such as memory buffers 181, 182, and 183, the component requests allocation of a memory chunk, such as memory chunk 170. In step 514, the component stores the memory buffer in the memory chunk.

In step 516, as a result of requiring a new memory buffer, the component requests that the memory chunk be extended (i.e. reallocated) to a size sufficient to accommodate the new memory buffer. In step 518, the component stores the new memory buffer in the memory chunk. Steps 516 and 518 may be repeated a number of times during processing of the first data source.

In step 520, the memory chunk is reused for processing a second data source in the collection with the event-generating process. For this second data source, the component stores all of the needed buffers within the memory chunk, without needing to extend the memory chunk.

In step 530, the component begins processing a third data source in the collection using the event-generating process. For this third data source, the component initially stores memory buffers within the memory chunk, without needing to extend the memory chunk.

In step 536, as a result of requiring a new memory buffer that will not fit into the free space remaining in the memory chunk, the component requests that the memory chunk be extended (i.e. reallocated) to a size sufficient to accommodate the new memory buffer. In step 538, the component stores the new memory buffer in the memory chunk. Steps 536 and 538 may be repeated a number of times during processing of the third data source.

As indicated in the flow diagram, step 520 may be repeated any number of times for other data sources, and may occur both before and after steps 530-538. In fact, some embodiments may not even require step 520. Likewise steps 530-538 may be repeated any number of times for other data sources, and may occur both before and after steps 520. In fact, some embodiments may not even require steps 530-538.

In each iteration of the process on a new data source, the memory chunk is carried over from the previous iteration. So, after a memory chunk is expanded to a new size during execution of the process in steps 530-538, all future iterations of the process will have access to the expanded memory that was added to the memory chunk. In this manner, the memory chunk will adaptively grow larger until it is sufficiently large to meet the anticipated demands of the document collection.

In step 540, the component requests that the memory manager deallocate the memory chunk.

According to an embodiment, this technique of adaptively adjusting the memory chunk size is used in conjunction with the evaluation of a training set discussed in the previous section. A pre-allocated memory chunk is used for each document in the training set. After evaluating a document, the mean memory usage is recalculated. The pre-allocated memory chunk is adjusted, if necessary, to reflect the new default memory size. The pre-allocated chunk may then be used with the remainder of the documents in the training set.

5.0. Implementation Mechanism—Hardware Overview

Figure 6:
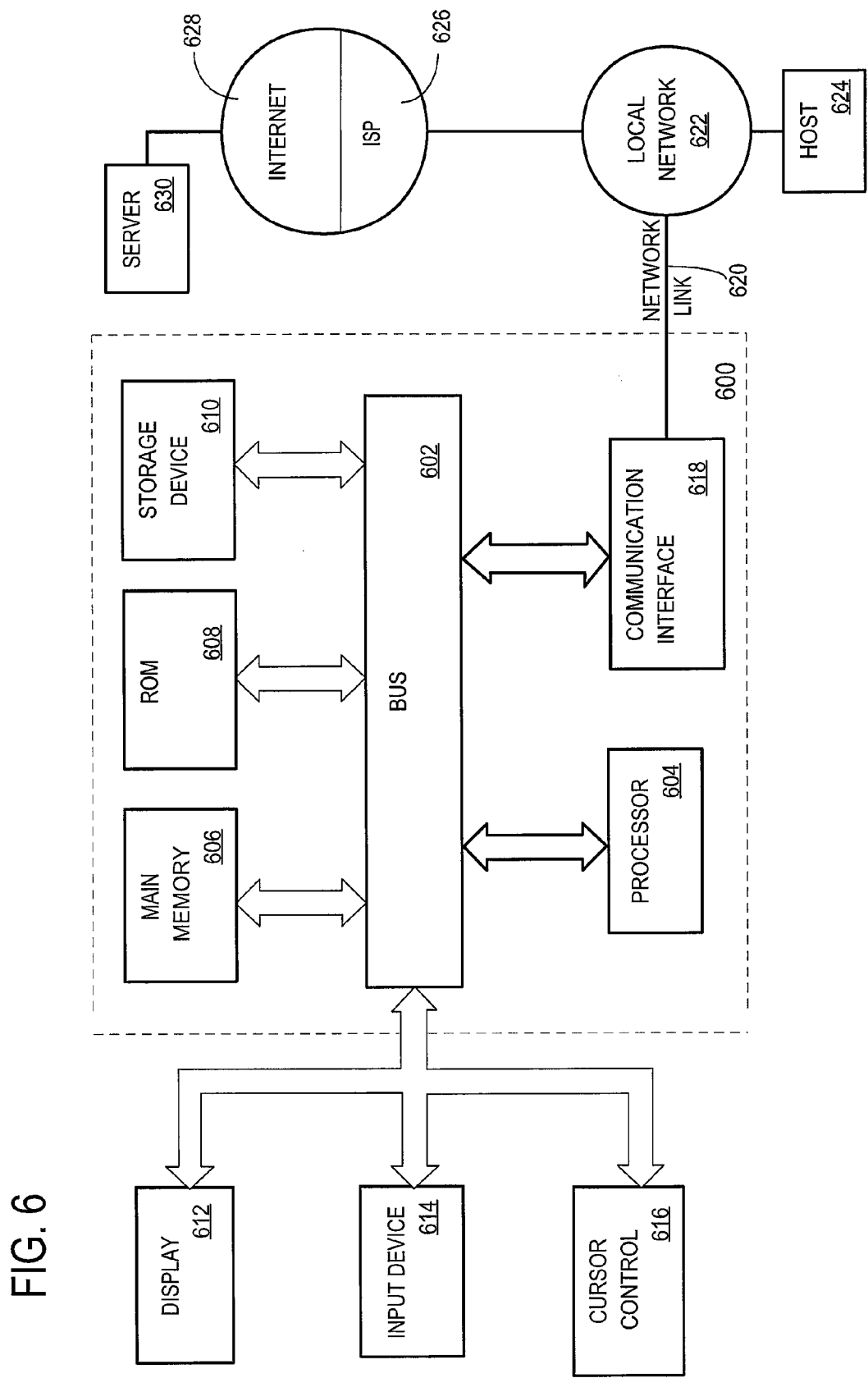
FIG. 6 is block diagram of a computer system upon which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to storage media and transmission media. Storage media includes both non-volatile media and volatile media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

6.0. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   based on one or more characteristics of an XML data source, determining a memory size for an XML event-generating process to process said XML data source;
   prior to processing the XML data source using the XML event-generating process, requesting, from a memory manager, allocation of a memory chunk of the memory size for use with the XML event-generating process;
   processing the XML data source using the XML event-generating process, thereby generating one or more XML events, wherein processing the XML data source comprises:
     the XML event-generating process determining that processing the XML data source requires the use of a plurality of memory buffers; and
     the XML event-generating process creating the plurality of memory buffers in the previously allocated memory chunk, without calling the memory manager; and
   after processing the XML data source, requesting that the memory manager deallocate the memory chunk;
   wherein the method is performed by one or more computing devices.

2. The method of claim 1,
   wherein the XML data source is a binary-encoded XML document, wherein processing the XML data source further comprises decoding the binary-encoded XML document;
   wherein determining to process the XML data source and processing the XML data source occur in response to a request from an application for textual form of the binary-encoded XML document.

3. The method of claim 1, wherein no other memory buffer is used during the processing of the XML data source.

4. The method of claim 1,
   wherein the XML event-generating process is associated with a state machine representing an XPath expression, wherein the one or more XML events are used as input for the state machine;
   wherein requesting the allocation of the memory chunk occurs during compilation of the state machine from the XPath expression.

5. The method of claim 1, further comprising:
   prior to determining the memory size, executing the XML event-generating process in a plurality of iterations on a set of XML data sources;
   while executing the XML event-generating process in the plurality of iterations, monitoring the XML event-generating process to determine, for each iteration of the plurality of iterations, a maximum total memory size of all memory buffers used during the iteration; and wherein determining the memory size is based at least on the determined maximum total memory sizes.

6. The method of claim 5, wherein the memory size is an average of each of the determined maximum total memory sizes plus three times a standard deviation in the maximum total memory sizes over the plurality of iterations.

7. The method of claim 1, further comprising:
identifying a set of XML documents that are based on a particular XML schema;
determining the memory size based on executing the XML event-generating process in a plurality of iterations on a set of XML data sources, wherein the memory size is specific to the particular XML schema; and
determining that the memory chunk is to be of the memory size based on determining that the XML data source is also based on the particular XML schema.

8. The method of claim 1, wherein the memory manager is provided by one of: a database system or an operating system.

9. The method of claim 1, wherein the memory size is specific to a particular XML schema, the method further comprising:
determining that the memory chunk is to be of the memory size based on determining that the XML data source is based on the particular XML schema.

10. The method of claim 1, further comprising, after processing the XML data source, adjusting the memory size for future data sources based upon memory usage while processing of the XML data source.

11. A method comprising:
based on one or more characteristics of a plurality of XML data sources, determining a memory size for an XML event-generating process to process said plurality of XML data sources;
prior to processing the plurality of XML data sources using the XML event-generating process, requesting, from a memory manager, allocation of a memory chunk of the memory size for use with the XML event-generating process;
processing the plurality of XML data sources using the XML event-generating process, thereby generating one or more XML events, wherein processing the plurality of XML data sources comprises:
wherein, for each particular XML data source of the plurality of XML data sources, processing the particular XML data source requires the use of at least one memory buffer; and
the XML event-generating process creating without calling the memory manager, each memory buffer required for processing the plurality of XML data sources in the same previously allocated memory chunk;
upon completion of processing the plurality of XML data sources, requesting that the memory manager deallocate the memory chunk;
wherein the method is performed by one or more computing devices.

12. The method of claim 11, wherein the memory size is specific to a particular XML schema, wherein each of the plurality of XML data sources pertains to the same particular XML schema.

13. The method of claim 11, wherein each of the plurality of XML data sources matches a particular query.

14. The method of claim 11, wherein processing the plurality of XML data sources further comprises:
processing a first XML data source, wherein processing the first XML data source comprises creating a first memory buffer stored in the memory chunk; and
processing a second XML data source, wherein processing the second XML data source comprises using the first memory buffer.

15. The method of claim 11, wherein processing the plurality of XML data sources further comprises processing a first XML data source, wherein processing the first XML data source comprises determining that the memory chunk has no room to store a particular memory buffer and, in response, requesting from the memory manager allocation of a temporary memory chunk to store the particular memory buffer.

16. The method of claim 11, wherein the memory size is a first size, the memory chunk is a first memory chunk, the plurality of XML data sources is a first plurality of XML documents, and the XML event-generating process is a first XML event-generating process;
wherein the first memory chunk is designated for use with documents that conform to a first XML schema, wherein the first plurality of XML documents conform to the first XML schema;
wherein the method further comprises, while maintaining the allocated first memory chunk, allocating a second memory chunk of a second size for use with a second XML event-generating process for processing a second plurality of XML documents that conform to a second XML schema, wherein the second XML schema is different than the first XML schema, wherein the second size is different than the first size.

17. The method of claim 11, further comprising determining the memory size based upon one or more of: memory usage during execution of a training set of XML documents, an XML schema, an average tree depth, or a user-specified value.

18. One or more non-transitory computer-readable media storing instructions that, when executed by one or more computing devices, cause performance of steps comprising:
based on one or more characteristics of an XML data source, determining a memory size for an XML event-generating process to process said XML data source;
prior to processing the XML data source using the XML event-generating process, requesting, from a memory manager, allocation of a memory chunk of the memory size for use with the XML event-generating process;
processing the XML data source using the XML event-generating process, thereby generating one or more XML events, wherein processing the XML data source comprises:
the XML event-generating process determining that processing the XML data source requires the use of a plurality of memory buffers; and
the XML event-generating process creating the plurality of memory buffers in the previously allocated memory chunk, without calling the memory manager; and
after processing the XML data source, requesting that the memory manager deallocate the memory chunk.

19. The one or more non-transitory computer-readable media of claim 18,
wherein the XML data source is a binary-encoded XML document, wherein processing the XML data source further comprises decoding the binary-encoded XML document;

wherein determining to process the XML data source and processing the XML data source occur in response to a request from an application for textual form of the binary-encoded XML document.

20. The one or more non-transitory computer-readable media of claim 18, wherein no other memory buffer is used during the processing of the XML data source.

21. The one or more non-transitory computer-readable media of claim 18,
wherein the XML event-generating process is associated with a state machine representing an XPath expression, wherein the one or more XML events are used as input for the state machine;
wherein requesting the allocation of the memory chunk occurs during compilation of the state machine from the XPath expression.

22. The one or more non-transitory computer-readable media of claim 18, wherein the instructions, when executed by the one or more computing devices, further cause performance of steps comprising:
prior to determining the memory size, executing the XML event-generating process in a plurality of iterations on a set of XML data sources;
while executing the XML event-generating process in the plurality of iterations, monitoring the XML event-generating process to determine, for each iteration of the plurality of iterations, a maximum total memory size of all memory buffers used during the iteration; and
wherein determining the memory size is based at least on the determined maximum total memory sizes.

23. The one or more non-transitory computer-readable media of claim 22, wherein the memory size is an average of each of the determined maximum total memory sizes plus three times a standard deviation in the maximum total memory sizes over the plurality of iterations.

24. The one or more non-transitory computer-readable media of claim 18, wherein the instructions, when executed by the one or more computing devices, further cause performance of steps comprising:
identifying a set of XML documents that are based on a particular XML schema;
determining the memory size based on executing the XML event-generating process in a plurality of iterations on a set of XML data sources, wherein the memory size is specific to the particular XML schema; and
determining that the memory chunk is to be of the memory size based on determining that the XML data source is also based on the particular XML schema.

25. The one or more non-transitory computer-readable media of claim 18, wherein the memory manager is provided by one of: a database system or an operating system.

26. The one or more non-transitory computer-readable media of claim 24, wherein the memory size is specific to the particular XML schema, wherein the instructions, when executed by the one or more computing devices, further cause performance of steps comprising:
determining that the memory chunk is to be of the memory size based on determining that the XML data source is based on the particular XML schema.

27. The one or more non-transitory computer-readable media of claim 18, wherein the instructions, when executed by the one or more computing devices, further cause performance of steps comprising: after processing the XML data source, adjusting the memory size for future data sources based upon memory usage while processing of the XML data source.

28. One or more non-transitory computer-readable media storing instructions that, when executed by one or more computing devices, cause performance of steps comprising:
based on one or more characteristics of a plurality of XML data sources, determining a memory size for an XML event-generating process to process said plurality of XML data sources;
prior to processing the plurality of XML data sources using the XML event-generating process, requesting, from a memory manager, allocation of a memory chunk of the memory size for use with the XML event-generating process;
processing the plurality of XML data sources using the XML event-generating process, thereby generating one or more XML events, wherein processing the plurality of XML data sources comprises;
wherein, for each particular XML data source of the plurality of XML data sources, processing the particular XML data source requires the use of at least one memory buffer; and
the XML event-generating process storing creating each memory buffer required for processing the plurality of XML data sources in the same previously allocated memory chunk;
upon completion of processing the plurality of XML data sources, requesting that the memory manager deallocate the memory chunk.

29. The one or more non-transitory computer-readable media of claim 28, wherein the memory size is specific to a particular XML schema, wherein each of the plurality of XML data sources pertains to the same particular XML schema.

30. The one or more non-transitory computer-readable media of claim 28, wherein each of the plurality of XML data sources matches a particular query.

31. The one or more non-transitory computer-readable media of claim 28, wherein processing the plurality of XML data sources further comprises:
processing a first XML data source, wherein processing the first XML data source comprises creating a first memory buffer stored in the memory chunk; and
processing a second XML data source, wherein processing the second XML data source comprises using the first memory buffer.

32. The one or more non-transitory computer-readable media of claim 28, wherein processing the plurality of XML data sources further comprises processing a first XML data source, wherein processing the first XML data source comprises determining that the memory chunk has no room to store a particular memory buffer and, in response, requesting from the memory manager allocation of a temporary memory chunk to store the particular memory buffer.

33. The one or more non-transitory computer-readable media of claim 28, wherein the memory size is a first size, the memory chunk is a first memory chunk, a plurality of documents is a first plurality of XML documents, and the XML event-generating process is a first XML event-generating process;
wherein the first memory chunk is designated for use with documents that conform to a first XML schema, wherein the first plurality of XML documents conform to the first XML schema;
wherein the instructions, when executed by the one or more computing devices, further cause performance of steps comprising, while maintaining the allocated first memory chunk, allocating a second memory chunk of a second size for use with a second XML event-generating process for processing a second plurality of XML documents that conform to a second XML schema, wherein the second XML schema is different than the first XML schema, wherein the second size is different than the first size.

34. The one or more non-transitory computer-readable media of claim 28, wherein the instructions, when executed by the one or more computing devices, further cause performance of steps comprising: determining the memory size based upon one or more of: memory usage during execution of a training set of XML documents, an XML schema, an average tree depth, or a user-specified value.

* * * * *

UNITED STATES PATENT AND TRADEMARK OFFICE
CERTIFICATE OF CORRECTION

PATENT NO.       : 8,543,898 B2
APPLICATION NO.  : 11/938020
DATED            : September 24, 2013
INVENTOR(S)      : Idicula et al.

Page 1 of 1

It is certified that error appears in the above-identified patent and that said Letters Patent is hereby corrected as shown below:

On Title page 3, column 1, Item (56) under Other Publications, line 26, delete "BINSML" and insert -- BINXML --, therefor.

On Title page 3, column 1, Item (56) under Other Publications, line 34, delete "Pulished" and insert -- Published --, therefor.

In the Claims

In column 13, line 51, in Claim 11, delete "creating" and insert -- creating, --, therefor.

In column 16, line 21, in Claim 28, delete "storing creating" and insert -- creating --, therefor.

Signed and Sealed this
Twenty-fifth Day of February, 2014

Michelle K. Lee
*Deputy Director of the United States Patent and Trademark Office*